United States Patent

Gendel et al.

[11] Patent Number: 6,115,407
[45] Date of Patent: Sep. 5, 2000

[54] FREQUENCY HOPPING COMMUNICATION METHOD AND APPARATUS FOR MODIFYING FREQUENCY HOPPING SEQUENCE IN ACCORDANCE WITH COUNTED ERRORS

[75] Inventors: Alon Gendel, Raanana; Yossi Waisblum, Kfar Saba, both of Israel

[73] Assignee: Butterfly VSLI Ltd., Kfar Saba, Israel

[21] Appl. No.: 09/054,875

[22] Filed: Apr. 3, 1998

[51] Int. Cl.[7] .......................... H04L 27/30; H04B 15/00; H04K 1/00; H04J 1/00
[52] U.S. Cl. ...................... 375/132; 375/131; 375/133; 375/134; 375/135; 375/136; 375/137; 370/343; 370/344; 370/480
[58] Field of Search ................. 375/132, 136, 375/131, 133, 134, 135, 137; 370/344, 343, 480

[56] References Cited

U.S. PATENT DOCUMENTS

| 5,394,433 | 2/1995 | Bantz et al. | 375/132 |
|---|---|---|---|
| 5,528,623 | 6/1996 | Foster, Jr. | 375/133 |
| 5,737,359 | 4/1998 | Koivu | 375/133 |
| 5,757,789 | 5/1998 | Dent | 370/337 |
| 5,758,290 | 5/1998 | Nealon et al. | 455/464 |
| 5,870,391 | 2/1999 | Nago | 370/330 |
| 5,937,002 | 8/1999 | Andersson et al. | 375/131 |
| 5,987,032 | 11/1999 | Nadgauda et al. | 370/437 |

*Primary Examiner*—Stephen Chin
*Assistant Examiner*—Michael W. Maddox
*Attorney, Agent, or Firm*—Ohlandt, Greeley, Ruggiero & Perle, L.L.P.

[57] ABSTRACT

The present invention is an apparatus and method thereof for performing frequency hopping (FH) communication with another party over an available spectrum of frequencies. The spectrum is arranged into a plurality of segments, with each segment corresponding to a subset of the frequencies, preferably a contiguous subset of the frequencies. The FH communication apparatus includes a communication device for communicating with another party. The communication device receives data over a sequence of hopping frequencies from the other party, with each of the hopping frequencies being part of a used segment from the plurality of segments. A storage device stores an error value for each used segment. A processing unit identifies a reception error in the received data and an erred segment in which the reception error occurred. The processing unit modifies the error value associated with the erred segment accordingly. The processing unit replaces the erred segment with an unused segment from the plurality of segments to attempt communication over a less error prone segment, when the error value for the erred segment has reached at least a predetermined threshold. The processing unit notifies the other party of the unused segment, which has been newly selected, via the communication device.

16 Claims, 11 Drawing Sheets

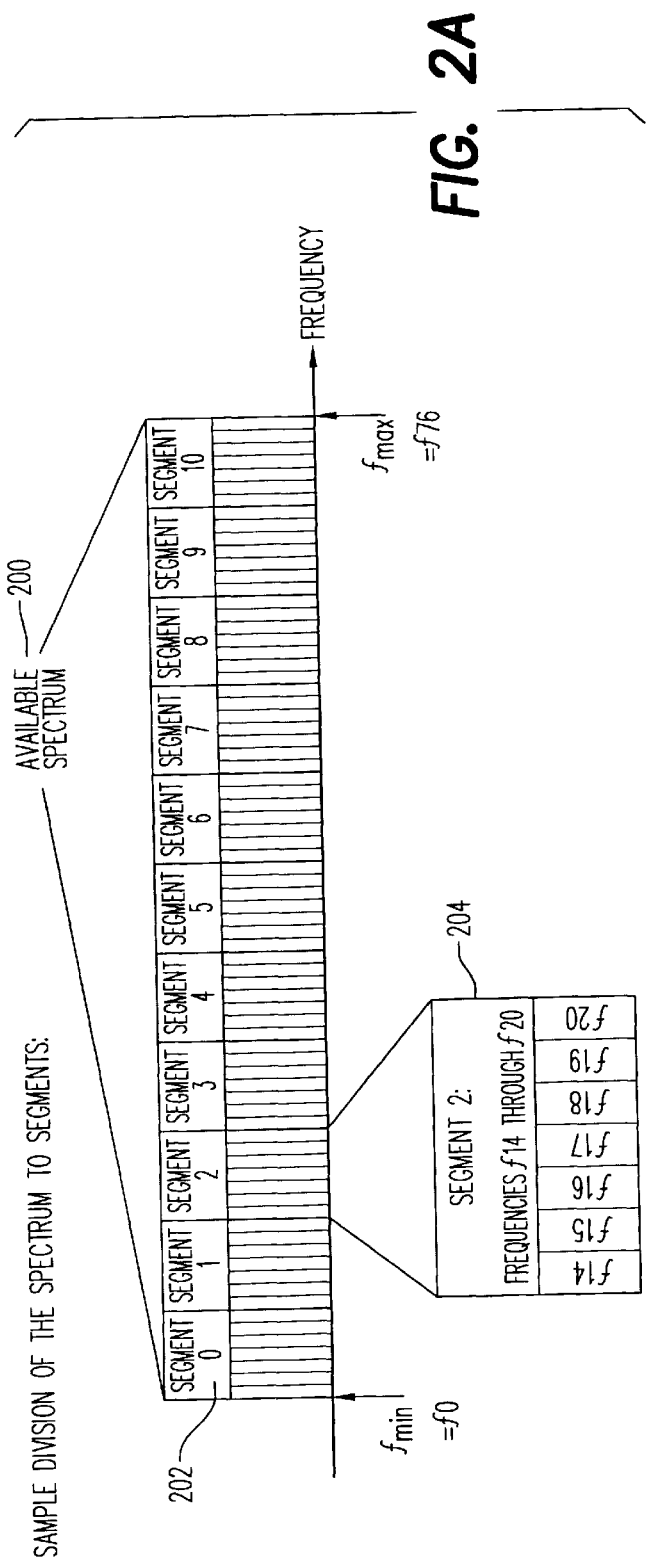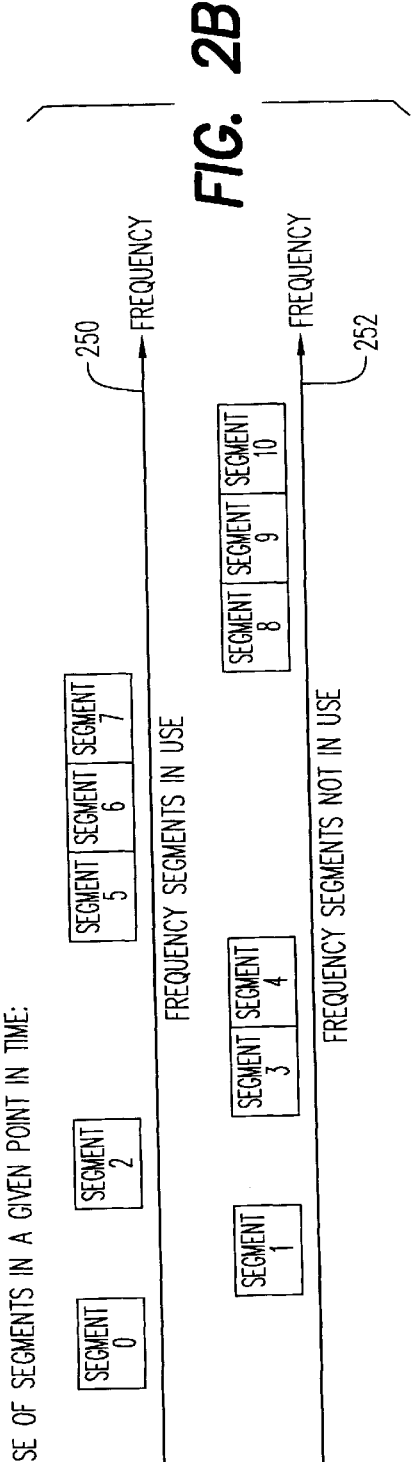

FREQUENCY HOPPING COMMUNICATION METHOD AND APPARATUS FOR MODIFYING FREQUENCY HOPPING SEQUENCE IN ACCORDANCE WITH COUNTED ERRORS

CROSS-REFERENCE TO RELATED APPLICATIONS

This application is related to application Ser. No. 09/054,877, entitled "AUTOMATIC TRANSMISSION POWER LEVEL CONTROL METHOD IN A FREQUENCY HOPPING COMMUNICATION SYSTEM," filed same date herewith, by Alon Gendel et al.

FIELD OF THE INVENTION

The present invention relates to a frequency hopping communication system and, more particularly, to a frequency hopping communication system with error detection capabilities. The present invention also relates to an automatic transmission power level control method for a frequency hopping system.

BACKGROUND OF THE INVENTION

Spread spectrum communication systems, such as frequency hopping (FH) communication systems, have excellent properties, such as high resistance to interference and data security. Such communication systems are known to be used in communication fields, such as satellite communication and ground communication, and are progressively being applied in mobile communication and local communication.

FH communication systems employ a wide bandwidth to perform communication. Such communication systems switch or modulate a carrier wave for data signals into different frequencies in accordance with spreading codes. An example of a conventional FH communication apparatus is briefly described below with reference with FIG. 12.

In a transmission operation, transmit data are composed of analog signals that are encoded in a coding circuit 1. The encoded data are modulated in a modulating circuit 2 through a modulating method, such as frequency shift keying (FSK) or a phase shift keying (PSK). The modulated data are mixed with outputs of a frequency synthesizer 8 in a mixer 3. Synthesizer 8 changes its output frequency in accordance with spreading codes (e.g., a frequency hopping pattern), which are generated by a spreading code generating circuit 7. The mixed data are amplified in a transmit circuit 4 and sent from an aerial 6, via a duplexer 5 that alternates between outputting the transmit data and inputting receive data from another FH communication device.

In a receive operation, signals received via aerial 6 are input into a receive circuit 11 through duplexer 5, and are amplified through a bandpass filter of receive circuit 11. The amplified signals are mixed with outputs of synthesizer 8 in a mixer 10. The frequency output from synthesizer 8 is hopped in accordance with a spreading code (e.g., a frequency hopping pattern), generated by spreading code generating circuit 7. A synchronous circuit 9 is adapted to obtain and hold synchronization for the switching of the frequency, and synchronizes the received signals with the output frequency of synthesizer 8. The synchronized outputs of mixer 10 are demodulated into binary data in a demodulating circuit 13, and are decoded into analog receive data in a decoding circuit 12.

A synchronizing operation of synchronous circuit 9 is generally described below. The receiving side apparatus initiates a preliminary synchronization by selecting a frequency ("selected frequency") from the hopping frequencies of a prescribed hopping pattern. The receiving side apparatus then determines whether the frequencies following the selected frequency match the received frequencies. If so, the receiving side apparatus continues modulating provisionally according to the hopping pattern (also referred herein as "hopping sequence"). If the received hopping frequencies continue to match the detected frequencies over one hopping cycle, after the preliminary synchronization, then FH communications have been synchronized between the transmitting-side apparatus and the receiving-side apparatus. Thereafter, the receiving-side apparatus activates a synchronization holding process to maintain the synchronization.

As described above, conventional FH communication systems vary carrier frequencies for spreading, meaning that a narrow-band transmission is seen at each period of an FH cycle. Accordingly, when a carrier frequency coincides with an existing communication frequency, some narrow-band jamming frequency or a hopping frequency of other FH communication devices, the signals transmitted on the carrier frequency may be degraded, thereby resulting in error signals at the receiving side apparatus. Interference frequencies may also coexist in a hopping frequency, resulting in degradation of the transmit signals. Furthermore, conventional FH systems may not be able to receive signals of a certain frequency band due to multi-path phasing.

Accordingly, there is a need to provide error detection and correction techniques in FH communication systems to remedy the above problems. In particular, there is a need to modify a hopping pattern in the event of reception errors.

One approach to remedying the above problem is found in U.S. Pat. No. 5,541,954 to Emi, which discloses a frequency hopping communication method and apparatus for changing a hopping frequency as a result of a counted number of errors. When a coding circuit informs a spreading code control unit of an error generation, it specifies an error prone carrier frequency and counts the errors for each hopping frequency. If the counted errors exceed a fixed value for a particular frequency, the spreading code control unit changes the particular frequency to another unused frequency and informs a data communication control unit of the change. The data communication control unit notifies the other party apparatus of the frequency change, via control signal. The other party apparatus receives the control data, changes the particular frequency to a corresponding new one, and resumes data transmission with the modified hopping pattern.

However, one problem with the Emi system is that errors affecting a particular transmission frequency may also affect neighboring frequencies, particularly, those that are being employed in the hopping pattern or are selected to replace the error-affected hopping frequency (hereinafter "erred frequency"). In such a case, the Emi system needs to replace the neighboring frequencies, thereby requiring communication to be stopped until a new sequence of frequencies can be transmitted to the other party. As a result, in such instances, the overall throughput rate of the communication system may be significantly degraded.

Another problem with the Emi system and other conventional FH communication systems is that such systems transmit FH modulated signals for all hopping frequencies at the same transmission power level. Furthermore, they operate at unnecessarily high transmission power levels to ensure that the transmitted signals will reach the receiving side device at a reasonable level. As such, these systems operate at inefficient power consumption levels. Such systems further transmit signals at transmission power levels that may interfere with other neighboring systems and pose a data security risk (e.g., the data is transmitted beyond a necessary transmission range, thus increasing the possibility of unauthorized access to the data).

There is a need to provide an apparatus and method that performs FH communication over less error prone hopping frequencies. There is also a need to provide an FH communication apparatus and method that minimizes the number of frequency hopping replacement operations and, more specifically, provides rapid and efficient elimination of erred areas or portions of an available frequency spectrum. Furthermore, there is a need to provide an FH communication apparatus and method that is capable of controlling the transmission power levels to optimize power consumption, minimize communication interference with neighboring devices and increase data security.

Accordingly, it is an object of the present invention to provide an efficient apparatus and method for error detection and link quality improvement in an FH communication system.

It is a further object of the present invention to provide an FH apparatus and method that employs efficient error detection techniques, minimizes the amount of FH replacement operations and provides rapid and efficient elimination of erred areas or portions of an available frequency spectrum.

Another object of the present invention is to provide an apparatus and method thereof for minimizing reoccurrence of transmission errors according to previously detected errors.

A further object of the present invention is to provide an FH communication apparatus and method that is capable of controlling the transmission power levels to optimize power consumption, minimize interference with neighboring devices and increase security.

Another object of the present invention is to provide an FH communication apparatus and method that optimizes transmission power level for each carrier frequency in a hopping pattern.

It is also an object of the present invention to provide an FH communication apparatus and method that is capable of automatically controlling the transmission power levels of each hopping frequency.

SUMMARY OF THE INVENTION

Before proceeding with a summary of the present invention, it is well to define certain terms to be used herein. The term "segment" will hereinafter refer to a subset of available frequencies of an available frequency spectrum. In the context of the present invention, the frequency spectrum is divided into a plurality of such segments with each segment including a contiguous subset of the available frequencies. A plurality of segments ("used segments") is used for the FH communication, wherein carrier or hopping frequencies are selected from the used segments to form a frequency hopping pattern for data transmission. The term "unused segment" refers to a segment that is not in use in the performance of FH communication.

A first embodiment of the present invention is a communication apparatus and method for performing frequency hopping (FH) communication with another party over an available spectrum of frequencies. The spectrum is arranged or divided into a plurality of segments, with each segment including a subset of the frequencies, preferably a contiguous subset of the frequencies. Each segment is preferably arranged to include an identical number of frequencies or an identical bandwidth. The FH communication apparatus includes a communication device for communicating with another party. The communication device receives data over a sequence of hopping frequencies from the other party, with the hopping frequencies being selected from used segments from the plurality of segments. A storage device stores an error value for each used segment. A processing unit identifies a reception error (also referred herein as error or errors) in the received data, and an erred segment in which the reception error occurred (e.g., the used segment that includes the hopping frequency over which the error occurred). The processing unit modifies the error value associated with the erred segment according to the occurrence of a reception error, the non-occurrence of a reception error, a pattern of reception error occurrences, etc. The processing unit replaces the erred segment with an unused segment from the plurality of segments to attempt communication over a less error prone segment, when the error value for the erred segment has reached at least a predetermined threshold. The processing unit notifies the other party of the unused segment, which has been newly selected, via the communication device, so that FH communication can be resumed with the substituted unused segment.

Accordingly, a used segment that experiences reception errors in one (or more) of its frequencies may be completely eliminated from the hopping scheme, by replacing the erred segment with an unused segment from a plurality of segments. For example, a used segment may include 7 frequencies, with 2 of the frequencies causing the error value of the used segment to reach or exceed a predetermined threshold. In such a case, the segment replacement process of the present invention will replace the entire used segment with a new unused segment, preferably also including 7 different frequencies.

By arranging the available frequencies into segments and performing FH communication over only a subset of the segments (e.g., the used segments), the present invention ensures a more rapid and efficient elimination of erred areas of the spectrum, be it a single erred frequency or several adjacent erred frequencies. Thus, a segment which is prone to reception errors is replaced at once, without the need to replace many frequencies one at a time.

A second embodiment of the present invention is an apparatus and method for performing frequency hopping communication with another party over an available spectrum of frequencies. The spectrum is arranged into a plurality of segments, with each segment corresponding to a subset of the spectrum of frequencies, preferably a contiguous subset of the spectrum. More specifically, the present invention is an apparatus and method for controlling automatically the transmission power levels of each segment used in an FH communication system. The apparatus includes a communication device for communicating with another party. The communication device receives data (e.g., data packets) over a used segment from the plurality of segments and received signal strength indication (RSSI) indicating a current signal reception level for the used segment from the other party. A processing unit analyzes the received data to determine an occurrence or non-occurrence of a reception error over the hopping frequency and notifies the other party to modify the current transmission power level of the used segment according to the occurrence or non-occurrence of a reception error, via the communication device.

For instance, a receiving-side apparatus may notify a transmitting-side apparatus to decrease a current transmission power level for a used segment when no reception error has occurred over the used segment at the current transmission power level (e.g., no reception errors have occurred for any one of the frequencies of the used segment). Alternatively, the receiving-side apparatus may notify the transmitting-side apparatus to increase the current transmission power level for the used segment when a reception error has occurred over the used segment at the current transmission power level (e.g., reception errors have occurred for one or more of the frequencies of the used segment). It is preferred that the transmitting-side apparatus is notified immediately to increase the current transmission power levels of the used segment upon the occurrence of a reception error over the used segment. On the other hand, it is preferred that the transmitting-side apparatus is notified, after a predetermined period (e.g., a delay period), to decrease the current transmission power level of the used segment if no reception error has occurred over the used segment at the current transmission power level.

Through the exchange of transmission power level information and error detection, the receiving-side party can independently control and optimize the transmission power level for each segment to reach a minimum transmission power level at which no reception error or an acceptable level of errors (i.e., correctable) has occurred for each segment, particularly for each used segment. That is, the receiving-side party would notify the transmitting-side party to modify (e.g., increase or decrease) the transmission power level of the used segments according to the occurrence or non-occurrence of reception errors, until the transmitting-side party transmits data at the optimum transmission power level for each used segment.

Such an arrangement minimizes power consumption, reduces the possibility of interference with neighboring FH or other communication devices, and increases data security by minimizing the reception z on e of the data packets. Such an arrangement further provides an error detection and monitoring implementation which responds quickly in the event of communication interference, and generally provides an overall improved communication link quality.

BRIEF DESCRIPTION OF THE DRAWINGS

FIG. 2A illustrates a sample division of a spectrum to segments in accordance with the present invention.

FIG. 2B illustrates a sample segment hopping pattern at a point in time for performing frequency hopping communication in accordance with the present invention.

DETAILED DESCRIPTION OF THE PREFERRED EMBODIMENT

A first embodiment of the present invention performs FH communication over a sequence of segments of an available frequency bandwidth and, moreover, performs error detection and modification of used segments in the performance of FH communication. The present invention divides an available frequency spectrum into a plurality of segments, with each of the hopping frequency being a part of a frequency segment, where the segments in use are selected from the plurality of segments. In operation, the present invention detects an occurrence or non-occurrence of a reception error over the used segments and modifies (e.g., increasing or decreasing) error values of the used segments accordingly. When the error value or a number of detected errors of a used segment reaches or exceeds a predetermined threshold, the used segment (e.g., erred segment) and all its hopping frequencies are replaced with an unused segment from the available spectrum. The other communicating party is notified of the replacement, and FH communication is then resumed with the modified hopping pattern.

Accordingly, a used segment that experiences reception errors in one (or more) of its frequencies may be completely eliminated from the hopping scheme, by replacing the erred segment with an unused segment from a plurality of segments. For example, a used segment may include 7 frequencies, with 2 of the frequencies causing the error value of the used segment to reach or exceed a predetermined threshold. In such a case, the segment replacement process of the present invention replaces the entire used segment with a new unused segment, preferably having 7 different frequencies.

By arranging the available frequencies into segments and performing FH communication over only a subset of the segments (e.g., the used segments), the present invention ensures a more rapid and efficient elimination of erred areas of the spectrum, be it a single erred frequency or several adjacent erred frequencies. Thus, a segment which is prone to reception errors is replaced at once, without the need to replace many frequencies one at a time.

Figure 1:
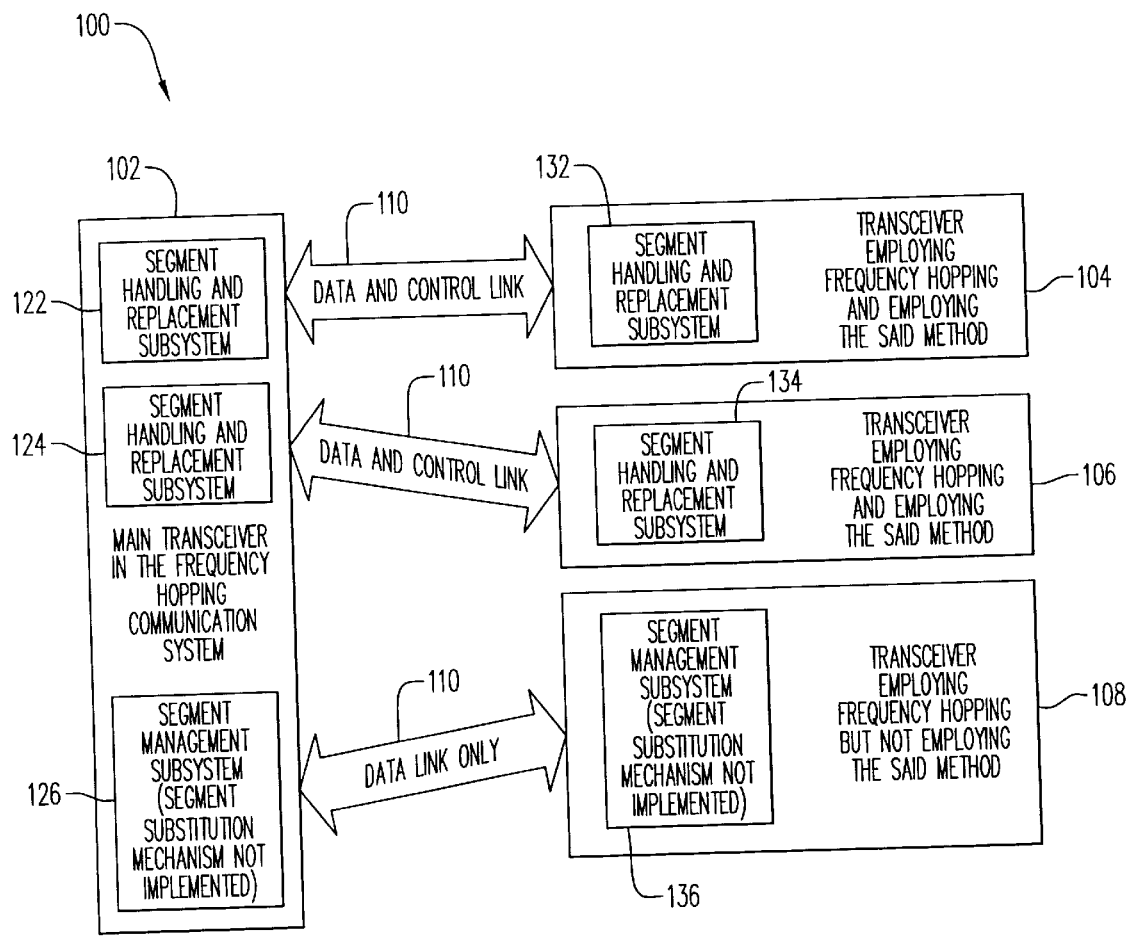
FIG. 1 illustrates an overview of an FH communication system employing error detection techniques of the present invention.

Referring to FIG. 1, there is provided a block diagram of a frequency hopping (FH) communication system 100 of the present invention. Communication system 100 includes a primary system 102, which performs FH communication with a plurality of secondary systems generally denoted by the reference numerals 104, 106 and 108, across a communication link(s) 110. As shown in FIG. 1, primary system 102 includes a plurality of communication subsystems generally denoted by the reference numerals 122, 124 for performing FH communication with secondary systems 104, 106 in accordance with the error detection method of the present invention. Likewise, secondary systems 104, 106 each include communication subsystems 132, 134, respectively, for performing FH communication with primary system 102 in accordance with the error detection and link improvement method of the present invention.

Each subsystem 122, 124, 132, 134 is adapted to transmit and receive data according to a spreading code designating a segment hopping sequence or pattern (e.g., $S_0$, $S_2$, $S_5$, $S_6$ and $S_7$), with the hopping frequencies being contained within the used segments. A hopping frequency may be randomly selected from a used segment or be a predetermined frequency from the used segment. Each subsystem 122, 124, 132, 134 is also adapted (a) to detect the occurrence or non-occurrence of a reception error from received data, (b) to identify a used segment from the hopping pattern in which the reception error occurred, and (c) to store and modify an error value for each used segment according to the number and/or type of reception errors affecting each used segment or the non-occurrence of reception errors over a predetermined period (e.g., one hopping period). When the error value of a particular used segment reaches or exceeds a predetermined threshold, subsystems 122, 124, 132, 134 replace the particular used segment (e.g., an erred segment) and all of its hopping frequencies with an unused segment. Subsystems 122, 124, 132, 134 then notify the other communicating party (e.g., the transmitting-side apparatus) of the replacement in the hopping pattern. Thereafter, primary system 102 and secondary systems 104, 106 may resume FH communication with the modified hopping pattern.

Referring to FIG. 2A, there is provided a sample division of an available spectrum of frequencies, generally denoted by the reference numeral 200, into a plurality of segments 202. Each segment 202 preferably includes a contiguous portion of available spectrum 200 or, more specifically, a contiguous subset of the frequencies of available spectrum 200. In this example, available spectrum 200 includes available frequencies $f_0$ through $f_{76}$, but may include any number of frequencies. Frequencies $f_0$ through $f_{76}$ are divided or arranged into 11 segments, each segment preferably including an identical number of frequencies (e.g., 7 frequencies per segment). As shown by the diagram denoted by reference numeral 204, a segment No. 2 includes the frequencies $f_{14}$ through $f_{20}$, which are a contiguous portion of spectrum 200.

It is preferred that the available spectrum be divided into segments in manner such that the number of used segments for FH communications is less than or equal to the number of unused segments. In this way, there is provided a suitable number of unused segments for replacing used segments which have an error value greater than or equal to a predetermined threshold to enable FH communications.

Referring to FIG. 2B, there is shown an example of the used segments at a given point in time. Trace 250 shows the used segments of a hopping pattern. FH communication is performed, in this example, with a hopping pattern of five used segments in the following order: segment No. 0 ($S_0$), segment No. 2 ($S_2$), segment No. 5 ($S_5$), segment No. 6 ($S_6$) and segment No. 7 ($S_7$), with the hopping frequencies being part of the used segments to perform FH communication.

Trace 252 shows the unused segments of the available spectrum. The remaining unused segments, in this example, are segment No. 1 ($S_1$), segment No. 3 ($S_3$), segment No. 4 ($S_4$), segment No. 8 ($S_8$), segment No. 9 ($S_9$) and segment No. 10 ($S_{10}$). As discussed above, the unused segments are employed to replace used segments that have an error value greater than or equal to a predetermined threshold.

Although the above describes one arrangement for dividing an available spectrum, it should be noted that FH communication may also be performed using a hopping pattern employing any number and sequential combination of segments.

Figure 3:
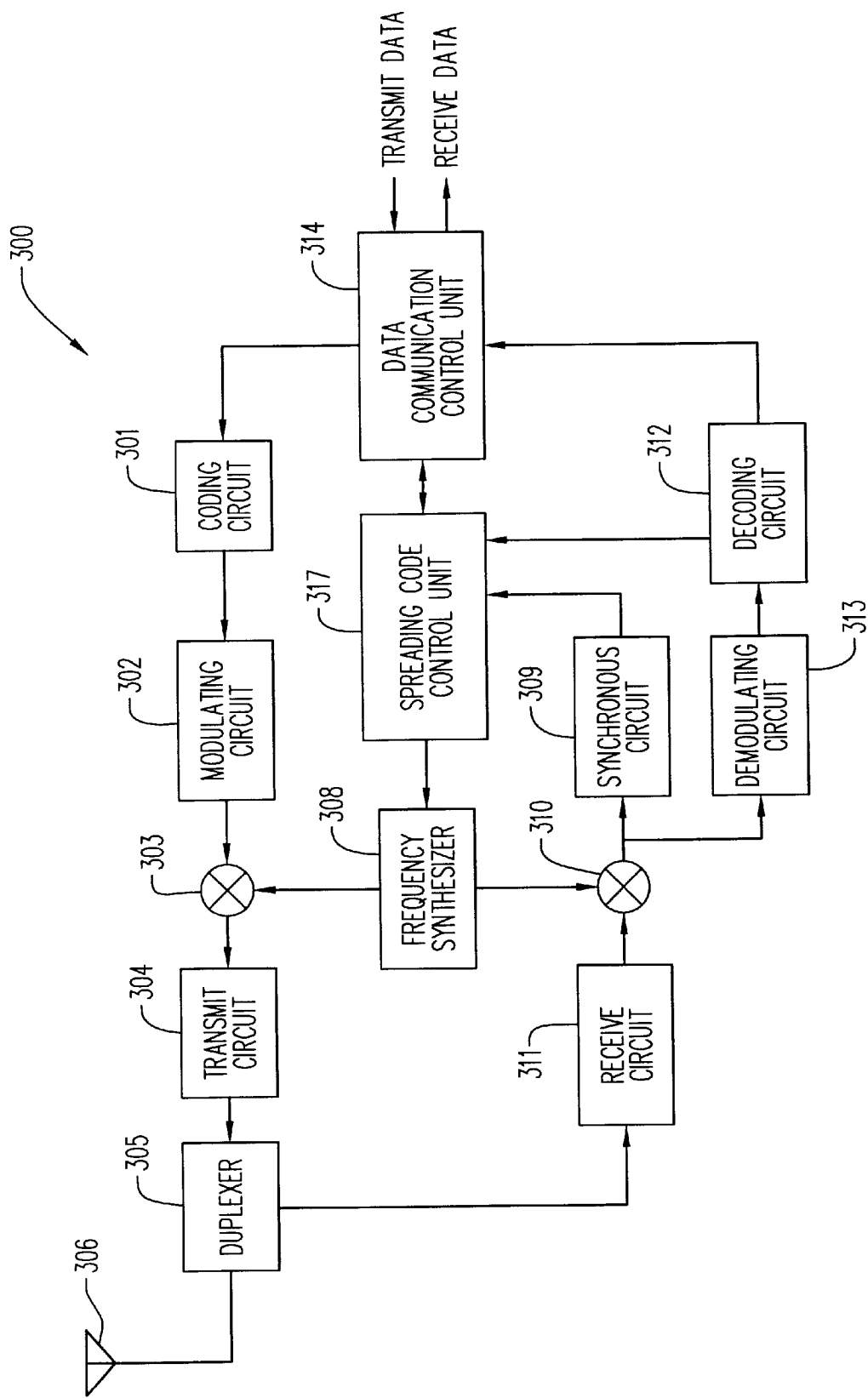
FIG. 3 illustrates a block diagram of a communication subsystem f or handling and replacing segments in accordance with the FH communication method of the present invention.

FIG. 3 illustrates a block diagram of the hardware of a communication subsystem 300, representative of subsystems 122, 124, 132, 134 of FIG. 1 and performing FH communication in accordance with the present invention. Communication subsystem 300 includes a coding circuit 301, which carries out encoding for data compression. A modulating circuit 302 performs data modulation of the encoded data through the use of, for example, frequency shift keying (FSK) or a phase shift keying (PSK). A mixer 303 mixes the modulated signals with a frequency output from a frequency synthesizer 308. A transmit circuit 304 amplifies the mixed signals at selected power transmission levels. A duplexer 305 is a switching circuit for switching between the transmitting side and the receiving side. An antenna 306 transmits and receives signals including data packets and control data.

Figure 12:
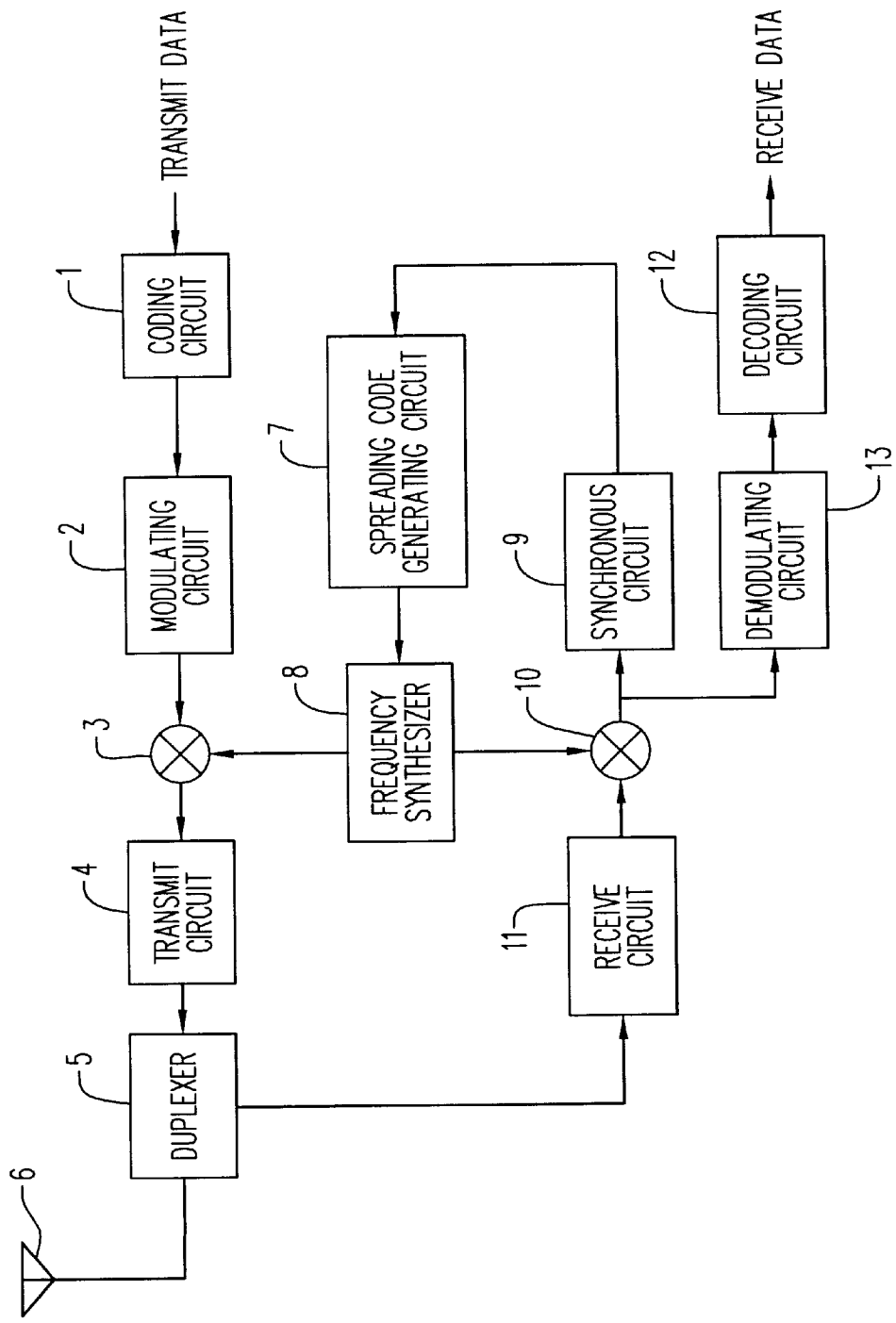
FIG. 12 illustrates an example of an FH communication apparatus of the prior art.

A receive circuit 311 selectively amplifies filtered signals of a specific frequency, received via antenna 306 and duplexer 305. A mixer 310 mixes outputs of a synthesizer 308 and outputs of receive circuit 311. A spreading code control unit 317 controls synthesizer 308 (via frequency selection signals and timing signals) to output a selected frequency. Synchronous circuit 309 performs a synchronizing and holding operation of the hopping frequencies in the same manner as synchronous circuit 9 shown in FIG. 12. Synchronous circuit 309 outputs synchronizing signals to spreading code control unit 317 so as to provide a suitable timing for frequency synthesizer 308 to change its output frequency (e.g., from one hopping frequency to a subsequent hopping frequency). A demodulating circuit 313 demodulates mixed data from synthesizer 308 and the received outputs from receive circuit 311. A decoding circuit 312 performs data expansion of the received encoded data, analyzes the received data to detect for the occurrence or non-occurrence of error signals, and informs spreading code control unit 317 of the occurrence or non-occurrence of reception errors.

Spreading code control 317 includes a spreading series code generating circuit (not shown) that selects frequencies according to a spreading code, e.g., a frequency hopping pattern, and controls frequency synthesizer 308 to output the selected frequency in accordance with the synchronizing timing from synchronous circuit 309. Spreading code control unit 317 includes an update error counter arrangement, shown and described below with reference to FIG. 4, for modifying error values associated with each used segment according to the occurrence or non-occurrence of reception errors detected by decoding circuit 312. Spreading code control unit 317 stores the error values into an accessible memory storage device (e.g., an error counter, table or the like). Spreading code control unit 317 also changes or updates the frequency hopping pattern by replacing or substituting a particular used segment with an unused segment, when the error value of the particular used segment reaches or exceeds a predetermined threshold. Such a sequence of operations will be described in greater detail below with reference to FIGS. 5 and 6. Moreover, spreading code control unit 317 transmits control data for controlling the overall communication process, analyzes control data received from another communicating party (e.g., request to modify the hopping pattern), and performs other generally known operations to facilitate FH communications.

The term transmitting unit will hereafter refer to coding circuit 301, modulating circuit 302, mixer 303, transmit circuit 304, duplexer 305 and antenna 306. The term receive unit will hereafter refer to antenna 306, duplexer 305, receive circuit 311, mixer 310, synchronous circuit 309, demodulating circuit 313 and decoding circuit 312.

An operational example of a transmit operation performed by communication subsystem 300 is provided below. Data communication control unit 314 receives data to be transmitted to another party and modifies the data into packet sizes suitable for transmission. The modified data is then encoded by coding circuit 301 and modulated by modulating circuit 302. Synthesizer 308 synthesizes and outputs an appropriate hopping frequency of a used segment according to spreading codes from spreading code control unit 317. Mixer 303 then mixes the modulated data from modulating circuit 302 with the appropriate hopping frequency from synthesizer 308. Thereafter, transmit circuit amplifies the mixed data at a selected power transmission level from a range of power levels. The amplified data is then transmitted over the appropriate hopping frequency via duplexer 305 and antenna 306.

An operational example of a receive operation by communication subsystem 300 is provided below. Antenna 306 receives signals (including data packets) from another party, which are input into receive circuit 311, via duplexer 305. Receive circuit 311 selectively amplifies filtered signals from a particular frequency, specifically the current hopping frequency in the hopping pattern. Spreading code control unit 317 controls synthesizer 308 to output a selected frequency, namely the current hopping frequency, according to a segment hopping pattern. Mixer 310 mixes the amplified signals from receive circuit 311 with the selected frequency from synthesizer 308 to perform an inverse spreading operation.

If the hopping frequencies of corresponding used segments are synchronized (via synchronous circuit 309), spreading code control unit 317 controls demodulating circuit 313 to modulate the inversely spread output from mixer 310 into binary data. The binary data are input into decoding circuit 312, which decodes the binary data and detects for the occurrence or non-occurrence of a reception error over the current hopping frequency of a current used segment in the hopping pattern. Thereafter, spreading code control unit 317 modifies an error value associated with the current used segment according to the occurrence or non-occurrence of a reception error in the received data. In the event the error value reaches or exceeds a predetermined threshold, spreading code control unit 317 replaces the current used segment with an unused segment, in accordance with the link improvement method of the present invention. Thereafter, the decoded data are composed in data communication control unit 314 composes the decoded data to obtain the original data transmitted from the other party.

Figure 4:
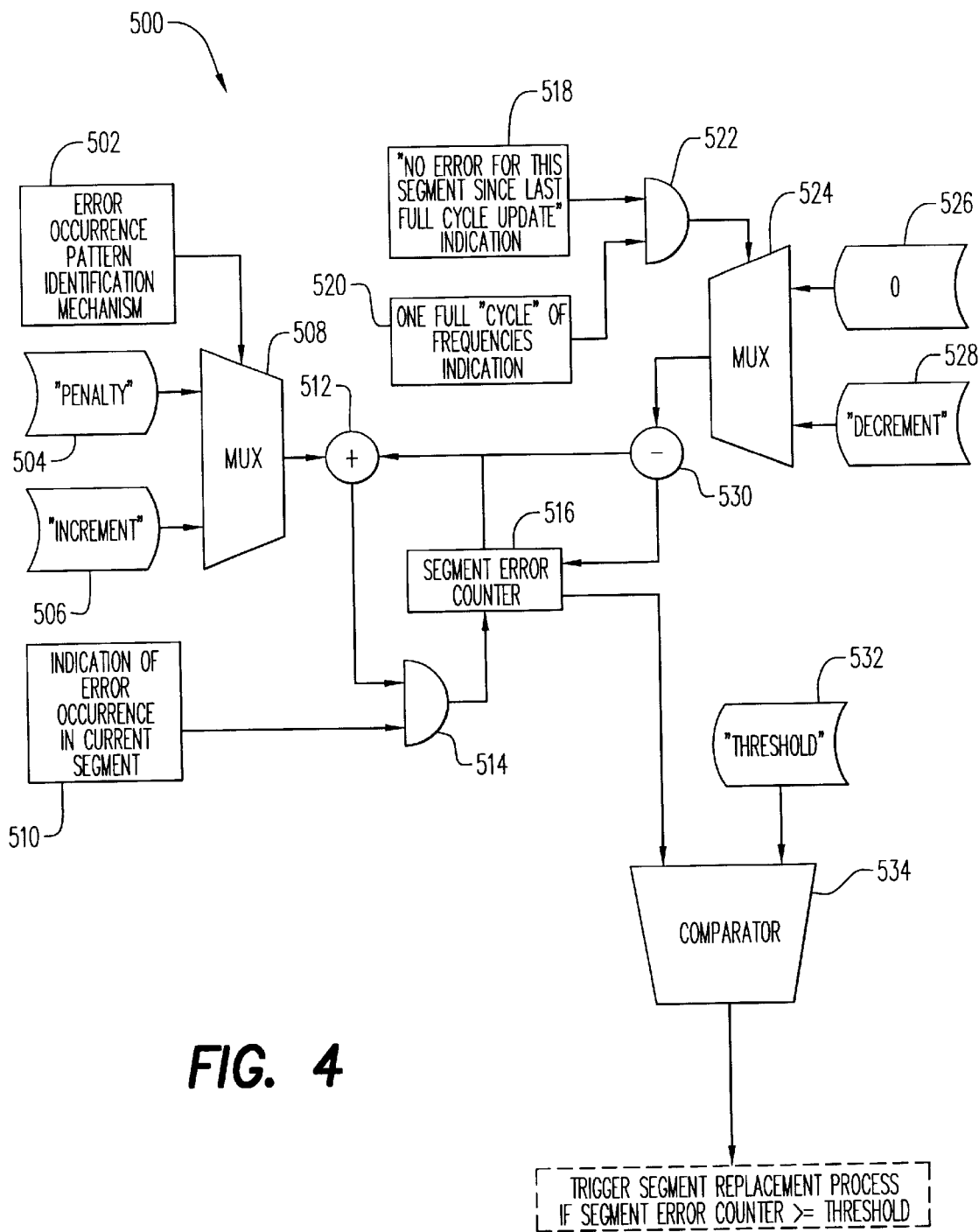
FIG. 4 illustrates a block diagram of a representative error counter of the present invention.

Referring to FIG. 4, there is provided an error update apparatus generally denoted by the reference numeral 500, which is incorporated into or associated with spreading code control unit 317 (FIG. 3). Update apparatus 500 modifies (e.g., increments, decrements, resets) an error value for each used segment upon the occurrence of particular events, such as the occurrence or non-occurrence of a reception error over each used segment, the occurrence of a predefined error pattern (e.g., two or more consecutive reception errors, regardless of the actual segment used when they occur), and so forth.

For an incrementing operation, update apparatus 500 includes a multiplexer (MUX) 508 that receives a penalty value 504 and an increment value 506. Increment value 506 is a number that is added to the error value of a used segment, when a reception error has occurred over a hopping frequency of the used segment and the reception error has not been identified as part of a predefined reception error occurrence pattern, such as the first occurrence of a reception error for the used segment. Penalty value 504 is a number that is added to the error value of a used segment, when a reception error has been identified for the used segment and the reception error is part of a predefined reception error occurrence pattern (e.g., two or more occurrences of a reception error).

An error identifier 502 identifies a particular error occurrence pattern and selects an appropriate output from MUX 508, such as the penalty value or the increment value. The output of MUX 508 is added to an error value that is maintained in segment error counter 516 of a current used segment if an error indicator 510 (e.g., from a decoding circuit 312) identifies a reception error over the current used segment. It is preferred that the present invention employs at least one segment error counter 516 for each used segment, although only one counter 516 is shown in FIG. 4.

For a decrementing operation, update apparatus 500 employs a multiplexer (MUX) 524 that receives a null value 526 (e.g., zero) and a decrement value 528. A decrement value is a number that is subtracted from the error values of any used segment that experiences no reception errors since a previous decrement update process. MUX 524 outputs the decrement value if no reception error has occurred over the current segment since the last full cycle update indication (generally denoted by reference numeral 518) and one full hopping cycle has elapsed (generally denoted by reference numeral 520). Otherwise, MUX 524 outputs a null value. The output of MUX 524 is subtracted from the error value of segment error counter 516, via a subtracter 530.

Referring again to FIG. 4, update apparatus 500 also includes a comparator 534 for receiving an error value from segment error counter 516 and from a predetermined threshold value 532. Comparator 534 compares the error value with the threshold value 532 for a current segment and triggers a segment replacement process or operation if the error value is greater than or equal to the threshold value 532. The segment replacement process is described in detail further below with reference to FIG. 6.

Since FH communication systems may vary as to their sensitivity towards reception error occurrences, it has been discovered that the values for the above described operating parameters (e.g., penalty value, increment value, decrement value, threshold value) may be adjusted to optimize error detection and link quality control for a particular FH communication system. There is provided below a few examples of the parameter relationships that may be suitably employed depending on the particular FH communication system.

Penalty Value>Increment Value: This arrangement may be suitable for FH communication systems which are known to be more sensitive to interference resulting in specific error occurrence patterns, than to interference resulting in other error occurrence patterns.

Decrement Value<Increment Value: This arrangement allows a single hopping frequency, which experiences errors, to increase its associated segment error counter until it reaches the threshold value, at which time the hopping frequency and its associated segment are replaced.

Threshold Value>Penalty Value and Threshold Value >Increment Value: The larger the threshold value in relation to the increment and penalty values, the longer it would take to replace a used segment that experiences reception errors.

Accordingly, the above parameters may be adjusted in varying relations to each other to provide varying levels of sensitivity as to the replacement of segments due to reception errors. Moreover, additional parameters, other than increment, penalty and decrement values, may also be incorporated to represent a type of error or the occurrence of a particular event, which may require the error value to be incremented or decremented by a suitable value. For instance, another input can be added to MUX 524 to decrement the error value by an amount greater than the decrement value if no reception error has occurred after two or more complete cycles for the current used segment.

Figure 5:
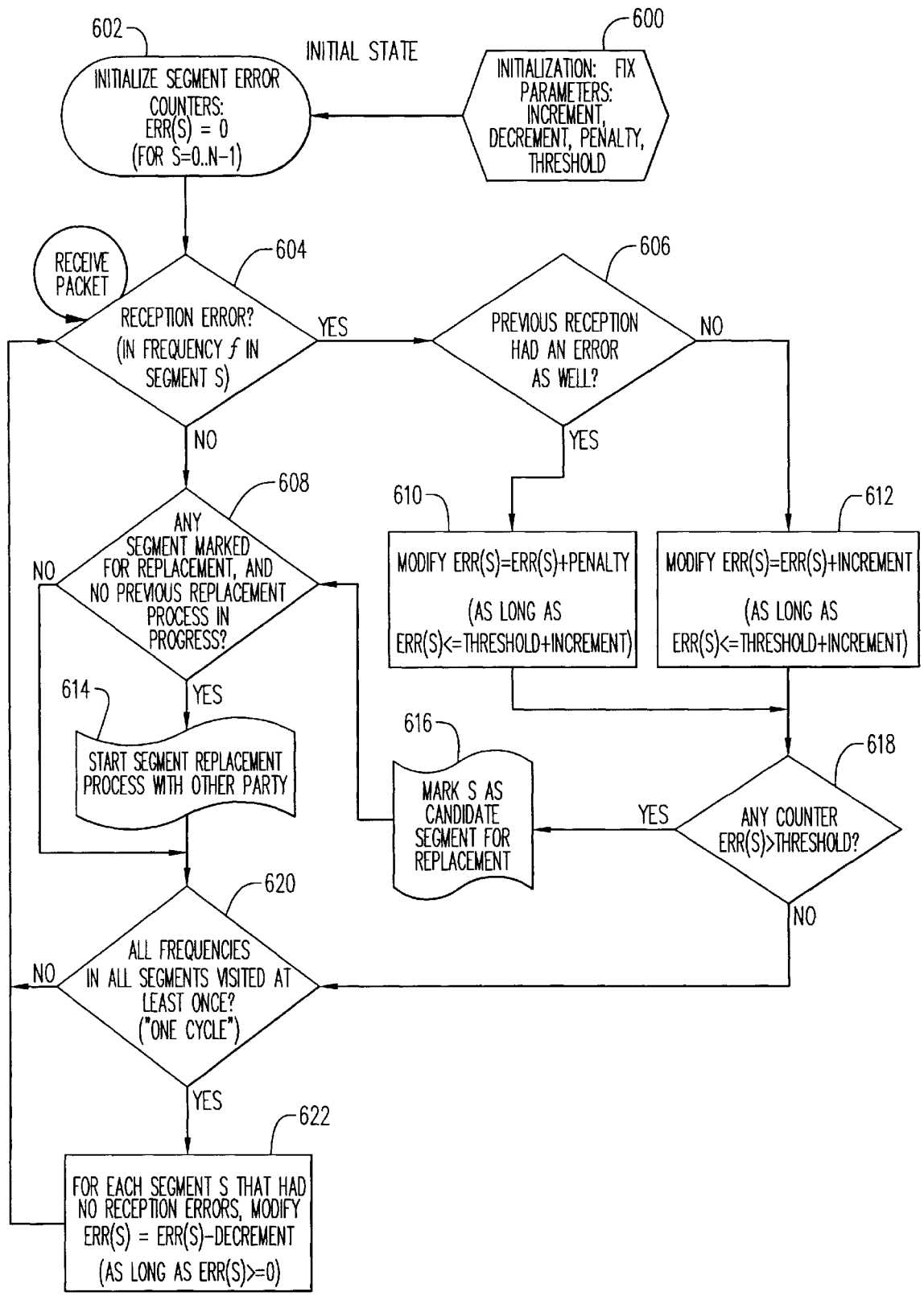
FIG. 5 illustrates a flow diagram of a segment error counter update and segment replacement method of the present invention.

Referring to FIG. 5, there is provided an operational example of a segment error counter update of the present invention. The system parameters, such as increment, decrement, penalty and threshold, are initialized (Step 600). The segment error counters 516 of each used segment are also initialized to a default error value, such as zero (e.g., Err(S)=0 for S=0. .N−1) (Step 602). Communication subsystem 300 (FIG. 3) receives a data packet (e.g., received data) and checks for an occurrence or non-occurrence of a reception error over the current hopping frequency $f_{CURRENT}$ of a current used segment $S_{CURRENT}$ (Step 604). If a reception error has occurred over the frequency $f_{CURRENT}$, subsystem 300 checks whether the current reception error was preceded by a reception error (regardless of the frequency $f$ or segment $S$ which was used then)(Step 606). If so, subsystem 300 adds a penalty value to the error value of segment SCURRENT maintained in an associated segment error counter 516 (e.g., ERR(S)=ERR(S)+ PENALTY) (Step 610). If not, subsystem 300 adds an increment value to the error value of segment $S_{CURRENT}$ (e.g., ERR(S)=ERR(S)+INCREMENT) (Step 612). In any event, subsystem 300 determines whether the error value of segment $S_{CURRENT}$ is greater than or equal to a predetermined threshold value (e.g., if ERR(S)>threshold value) (Step 618).

If the error value of segment $S_{CURRENT}$ is greater or equal than the threshold, subsystem 300 marks the segment $S_{CURRENT}$ as a candidate for segment replacement (Step 616). Subsystem 300 then initiates the segment replacement process with the other party, which is shown and described with regard to FIG. 6 (Steps 608 and 614). Thereafter, subsystem 300 determines whether all hopping frequencies in all used segments have been visited at least once, e.g., whether one cycle has passed (Step 620). If one hopping cycle has elapsed, subsystem 300 modifies the error value of each used segment S in which no reception error has occurred by subtracting a decrement value from their error values (e.g., ERR(S)=ERR(S)−Decrement) (Step 622). In either case, the process returns to Step 604 to check for an occurrence of a reception error on the next hopping frequency $f_{NEXT}$ Of the next used segment $S_{NEXT}$ in the hopping pattern.

Turning back to Step 604, if a reception error has not occurred in the current frequency $f_{CURRENT}$ of the current used segment $S_{CURRENT}$, then subsystem 300 determines whether any segment has been marked for segment replacement and whether no previous segment replacement process is in progress (Step 608). If so, subsystem 300 initiates the segment replacement process with the other party, which is described further below with reference to FIG. 6 (Step 614). In either case, subsystem 300 then determines whether all hopping frequencies in all used segments have been visited at least one, e.g., whether one hopping cycle has elapsed (Step 620). If one hopping cycle has elapsed, subsystem 300 modifies the error value of each used segment S in which no reception error has occurred by subtracting a decrement value from their error values (e.g., ERR(S)=ERR(S)−Decrement) (Step 622). In either case, the process returns to Step 604 to check for an occurrence of a reception error on the next hopping frequency $f_{NEXT}$ of the next used segment $S_{NEXT}$.

Figure 6:
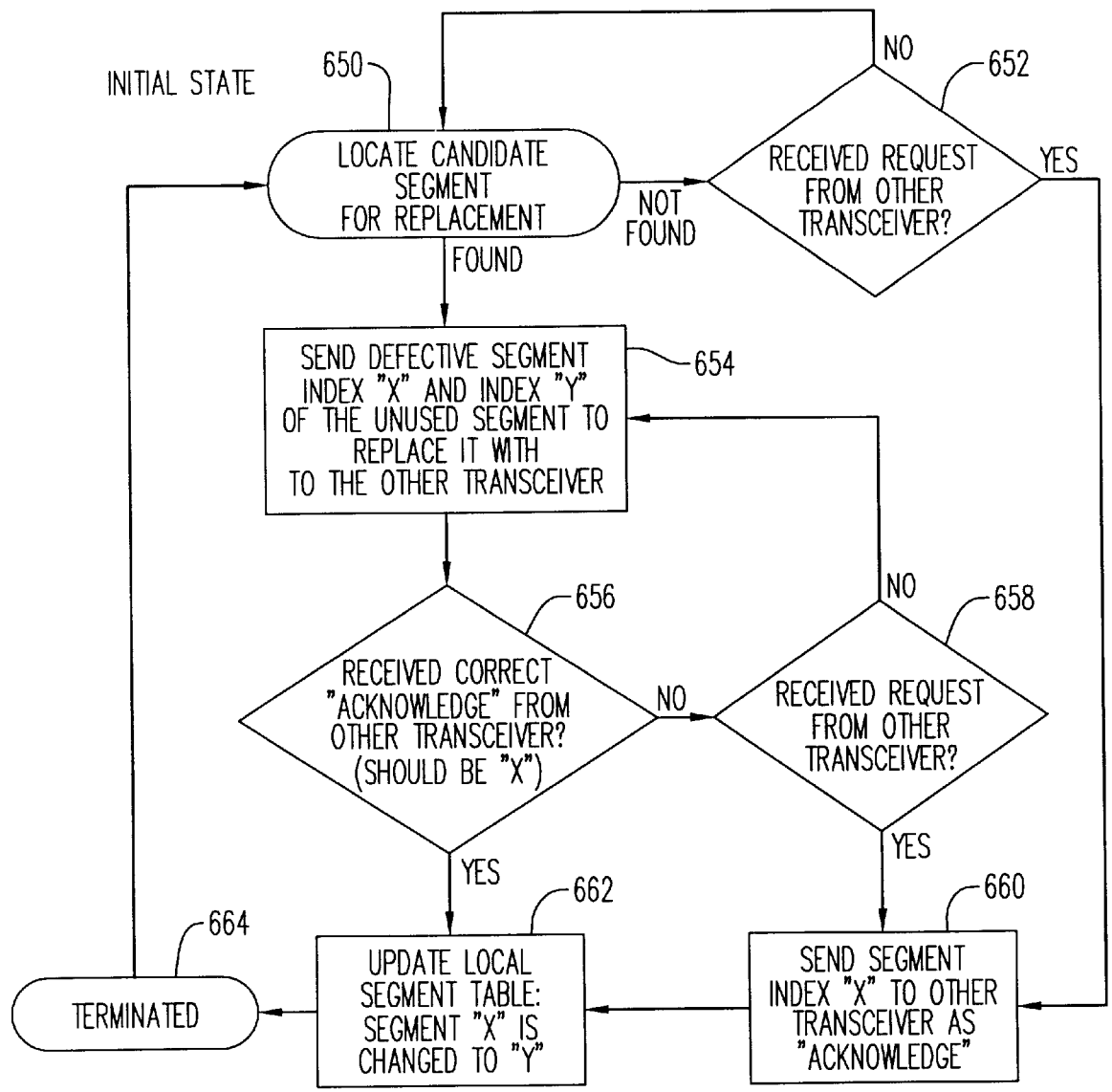
FIG. 6 illustrates a flow diagram of a segment replacement operation of the present invention.

Referring to FIG. 6, there is provided an operational example of a segment replacement for Step 614 of FIG. 5. The process begins by locating a candidate segment for replacement, e.g., a segment marked for replacement or the like (Step 650). If no candidate is found, subsystem 300 (FIG. 3) determines whether the other party (not shown) has transmitted a request to modify the frequency hopping pattern, e.g., requesting replacement of a used segment $S_{ERROR}$ and its frequencies (Step 652). If so, subsystem 300 transmits signals to the other party indicating an acknowledgement of receipt of the request to replace segment $S_{ERROR}$. Subsystem 300 then updates a segment hopping table (not shown) by replacing segment $S_{ERROR}$ with an unused segment $S_{UNUSED}$. The process is then terminated at Step 664.

Returning again to Step 652, if no request has been received from the other party, subsystem 300 attempts to locate a candidate segment for replacement (Step 650).

If a candidate segment $S_{ERROR}$ for replacement is located, subsystem 300 transmits a signal (e.g., a replacement request) to the other party requesting that segment $S_{ERROR}$ is to be replaced with unused segment $S_{UNUSED}$ (Step 654). The request signal preferably includes the segment number corresponding to segment $S_{ERROR}$ and the segment number corresponding to segment $S_{UNUSED}$ or the like. Thereafter, subsystem 300 checks whether a reply has been received from the other party acknowledging receipt of the request to modify the hopping pattern. If subsystem 300 receives the acknowledgement, subsystem 300 updates the segment hopping table by replacing segment $S_{ERROR}$ with the segment $S_{UNUSED}$. The process is then terminated at Step 664.

Returning to Step 656, if no request has been received from the other party (e.g., after a predetermined amount of time), subsystem 300 determines whether the other party has transmitted a request to modify the hopping pattern (Step 658). If not, the process returns to Step 654 where subsystem 300 retransmits a signal (e.g., a replacement request) to the other party requesting that segment $S_{ERROR}$ is to be replaced with unused segment $S_{UNUSED}$. Otherwise, the process goes to Step 660, 662 and 664, as described above.

Turning to a second embodiment of the present invention, there is provided an FH communication subsystem 300 (FIG. 3) having an automatic transmission power level control for controlling the transmission strength of each used segment and a method for performing the same. In this embodiment, subsystem 300 employs an independent power transmission level for each used segment to perform FH communication with a receiving-side FH communication party (e.g., another subsystem 300). The transmitting-side apparatus 300 transmits signals, such as data packets, according to a spreading code of used segments (as described above) and signal strength indications (RSSI) for each used segment, to a receiving-side apparatus 300. The RSSI indicates the current reception power level at which data packets are being received over a used segment. The receiving-side apparatus 300 tracks the occurrence or non-occurrence of reception errors for each used segment at the indicated reception power levels or signal strengths and notifies the transmitting-side apparatus 300 to modify the transmission power level for the used segments accordingly. For instance, the receiving-side apparatus 300 notifies the transmitting-side apparatus 300 to decrease the transmission power level for a particular used segment when no reception error has occurred for the particular used segment at the current transmission power level, or to increase the transmission power level for the particular used segment when a reception error has occurred for the particular used segment at the current transmission power level. FH communication can then be resumed with the modified transmission power level for the particular used segment.

Through the exchange of transmission power level information according to detected reception errors, an optimal transmission power level for a particular used segment can be achieved by the FH communication system. That is, the receiving-side party notifies the transmitting-side party to adjust (e.g., increase or decrease) the transmission power level of each used segment according to detected reception errors until the optimum transmission power level is reached. The optimum transmission power level is the minimum transmission power level at which the particular used segment may be transmitted without the occurrence of reception errors.

Such an arrangement minimizes power consumption, reduces the possibility of communication interference with FH or other communication devices, and increases data security by minimizing the transmission zone of the data packets. Such an arrangement further provides an error detection and correction implementation, which responds quickly in the event of communication interference (e.g., reception error(s)), and generally provides an overall improved communication link quality. Accordingly, the present invention provides an apparatus and method thereof for optimizing transmission power levels in an FH communication system to be described with reference to FIGS. 7 through 11.

Figure 7:
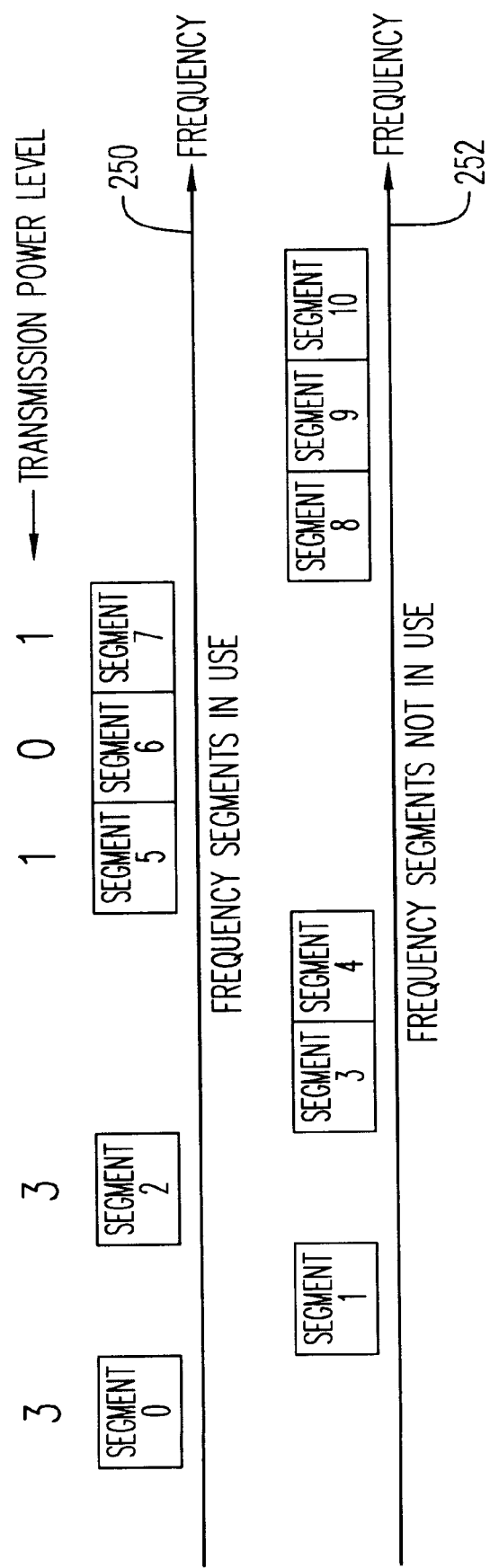
FIG. 7 illustrates a sample segment hopping pattern and associated transmission power levels for each hopping segment at a point in time for performing FH communication in accordance with a second embodiment of the present invention.

Turning to a more detailed description of the second embodiment, FIG. 7 illustrates a sample use of segments similar to that shown in FIG. 2B, except that each used segment is transmitted at a transmission power level independent from the other used segments. Trace 250 shows the used segments of a hopping pattern. FH communications are performed, in this example, with a hopping pattern of five used segments in the following manner: segment No. 0 ($S_0$), segment No. 2 ($S_2$), segment No. 5 ($S_5$), segment No. 6 ($S_6$) and segment No. 7 ($S_7$), with the hopping frequencies being part of the used segment. Each used segment is transmitted at a transmission power level independent of other used segments, via transmit circuit 304 (FIG. 3). For example, segment $S_0$ is transmitted at a power level of 3; segment $S_2$ is transmitted at a power level of 3; segment $S_5$ is transmitted at a power level of 1; segment $S_6$ is transmitted at a power level of 0; and segment $S_7$ is transmitted at a power level of 1. Note that the values shown in FIG. 7 for the transmission power levels of each used segment are provided merely to illustrate the different transmission power levels for each used segment (where the value 0 is the minimum level, and the value 3 is the maximum level).

Trace 252 illustrates the unused segments of the available spectrum. The remaining unused segments, in this example, are segment No. 1 ($S_1$), segment No. 3 ($S_3$), segment No. 4 ($S_4$), segment No. 8 ($S_8$), segment No. 9 ($S_9$) and segment No. 10 ($S_{10}$).

Figure 8:
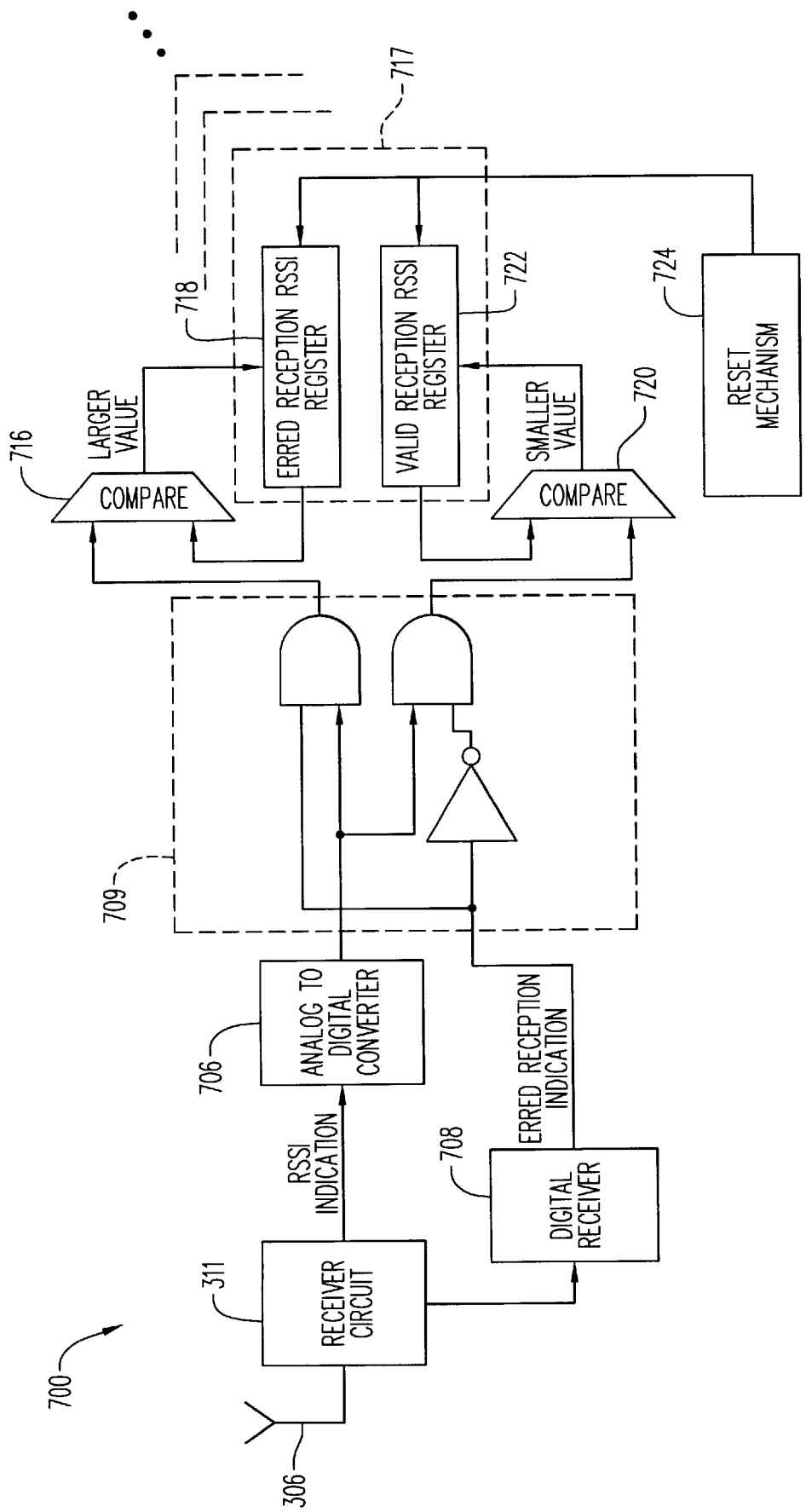
FIG. 8 illustrates a block diagram of the components for updating received signal strength indication (RSSI) registers employed for tracking the maximum and minimum reception power levels for a used segment, in accordance with a second embodiment of the present invention.

Referring to FIG. 8, there is provided a block diagram of a power level update arrangement 700 incorporated into or associated with communication subsystem 300 (FIG. 3). Arrangement 700 employs a register bank 717 including two received signal strength indication (RSSI) registers, namely an erred reception RSSI register 718 and a valid reception RSSI register 722. Erred reception RSSI register 718 maintains a maximum RSSI value for which a reception error has occurred for a used segment. Valid reception RSSI register 722 maintains a minimum RSSI value for which a reception error has not occurred for a used segment. Such an arrangement allows subsystem 300 to track the occurrence or non-occurrence of reception errors over the used segments at various transmission power levels and to notify the other party to adjust the transmission power levels accordingly. Through the exchange of information, an optimal transmission power level for each used segment is achieved in the FH communication system.

It should be understood that each segment preferably has associated therewith a register bank 717 from a plurality of register banks 717 as generally shown in FIG. 8. Although it is preferred that a register bank 717 is employed to store the minimum RSSI value and the maximum value as discussed above, the present invention may employ other arrangements for performing the same.

Receive circuit 306 receives signals from another party, via antenna 306 and duplexer (FIG. 3). The signals may include a data packet and control data, such as a RSSI indication, a request to change the transmission power level of a used segment, and so forth. The RSSI indication indicates a reception signal strength of the received packet. A digital receiver 708 checks the received data packet to determine the occurrence or non-occurrence of a reception error, and may take the form of a decoding circuit 312 of FIG. 3. An analog-to-digital (A/D) converter 706 converts the received RSSI indication from analog to digital. The RSSI indication in digital form is then outputted to a switching circuit 709, which outputs the RSSI indication either to comparator 716 or comparator 720, depending on whether digital receiver 708 has detected the occurrence of a reception error over a current used segment. In particular, switching circuit 709 outputs the RSSI indication to comparator 716 if digital receiver outputs an error reception indication (e.g., a HIGH), or outputs the RSSI indication to comparator 720 if digital receiver 708 outputs a non-error reception indication (e.g., a LOW).

If a reception error is indicated by digital receiver 708, comparator 716 compares the RSSI indication with a RSSI value from erred reception RSSI register 718. Comparator 716 selects and outputs the larger of the RSSI indication and the RSSI value, which is then stored in erred reception RSSI register 718. Accordingly, the RSSI value maintained in register 718 is the current maximum RSSI value, e.g., the current maximum (or higher) power reception level, for which a reception error has occurred for the used segment.

If no erred reception is indicated by digital receiver 708, comparator 720 compares the RSSI indication with a RSSI value from valid reception RSSI register 722. Comparator 720 selects and outputs the smaller of the RSSI indication and the RSSI value, which is then stored in valid reception RSSI register 722. Accordingly, the RSSI value maintained in register 722 is the current minimum RSSI value, e.g., the current minimum (or lower) power reception level, for which no reception error has occurred for the used segment.

An operational example of a segment RSSI register update is described below with reference to FIGS. 8 and 9. Initially, RSSI registers 718 and 722 for each used segment are reset to a default power level value, e.g., zero. The process is initiated at Step 750 upon receipt of a data packet ("received data") over a current frequency $f_{CURRENT}$ of a current used segment $S_{CURRENT}$ from another party. Communication subsystem 300 then obtains a received signal strength indication (RSSI) for the reception (e.g., the reception power) (Step 752). Subsystem 300 then determines whether a reception error has occurred (Step 754). If a reception error has occurred, subsystem 300 determines whether the RSSI value of the reception is greater than the value maintained in erred reception RSSI register 718 (FIG. 8). If so, RSSI register 718 is updated with the RSSI value (Step 758), and a transmission power level change operation is executed as described further below with reference to FIG. 10 (Step 764).

Subsystem 300 then determines whether a request for transmission power level change was generated (Step 766). If a request was generated, RSSI registers 718 and 722 (FIG. 8) are reset to a default value (Step 768). In any event, the process is reinitiated at step 750 with the receipt of the next data packet over the next frequency $f_{NEXT}$ of the next used segment $S_{NEXT}$ in the hopping pattern.

Returning to Step 754, if there is no reception error, subsystem 300 determines whether the RSSI value for the reception is less than the value maintained by valid reception RSSI register 722 (FIG. 8) (Step 760). If so, valid reception RSSI register 722 of $S_{CURRENT}$ is updated with the RSSI value for the reception. A transmission power level change operation for $S_{CURRENT}$ is then executed (Step 764). Subsystem 300 then determines whether a request for transmission power level change was generated (Step 766). If a request was generated, RSSI registers 718 and 722 (FIG. 8) are reset to a default value (Step 768). In any event, the process is reinitiated at step 750 with the receipt of the next data packet in a frequency $f_{NEXT}$ in the next used segment $S_{NEXT}$.

Returning to Step 760, if the RSSI value for the reception is not less than the value maintained by valid reception RSSI register 722 (FIG. 8) (Step 760), the process proceeds to Step 764 in which a transmission power level change operation is executed (Step 764). Subsystem 300 then determines whether a request for transmission power level change was generated (Step 766). If a request was generated, RSSI registers 718 and 722 (FIG. 8) are reset to a default value (Step 768). In any event, the process is reinitiated at step 750 with the receipt of the next data packet in the next frequency $f_{NEXT}$ of the next used segment $S_{NEXT}$ in the hopping pattern.

Figure 9:
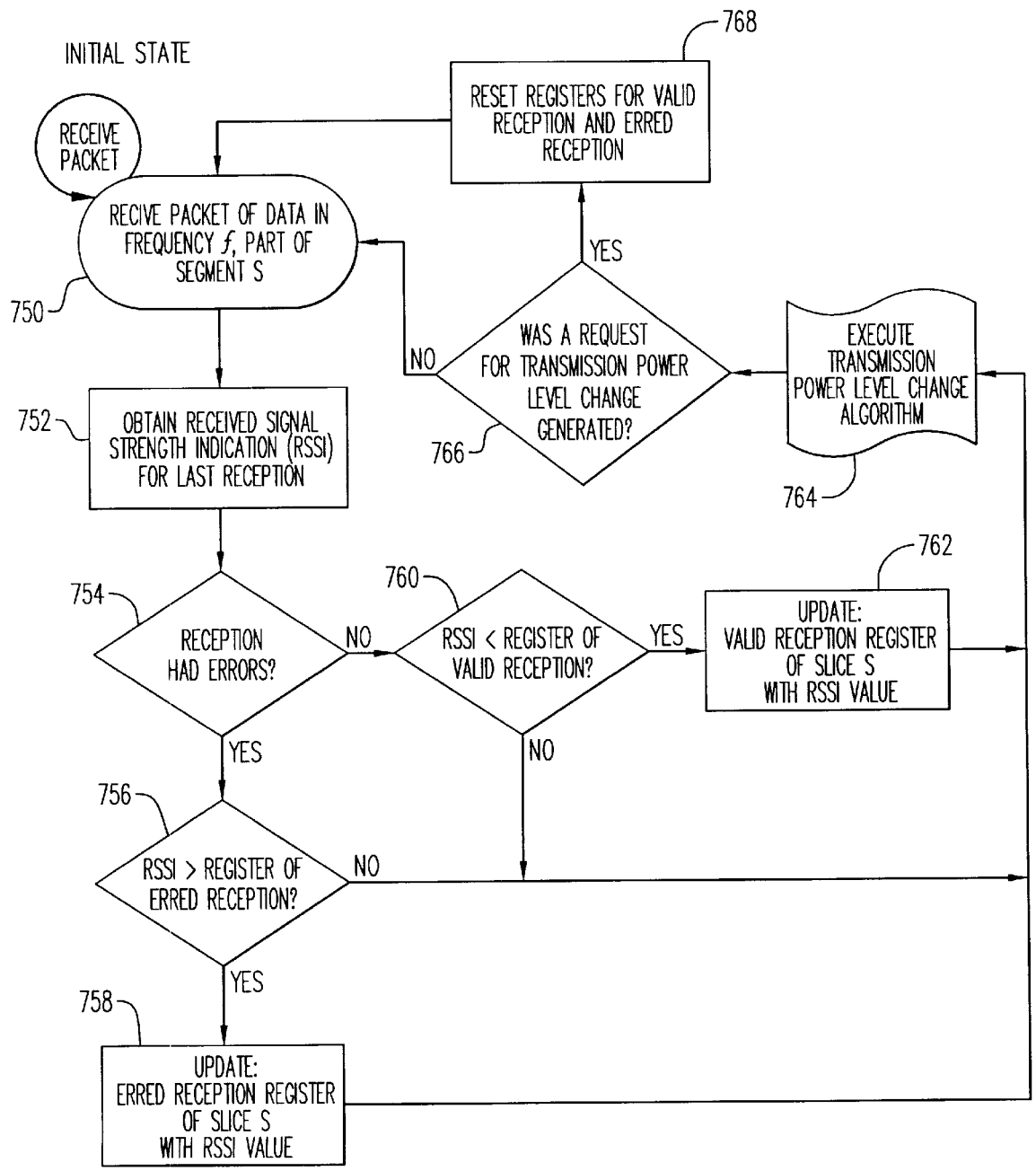
FIG. 9 illustrates a flow diagram of a RSSI register update operation in accordance with a second embodiment of the present invention.
Figures 10, 11:
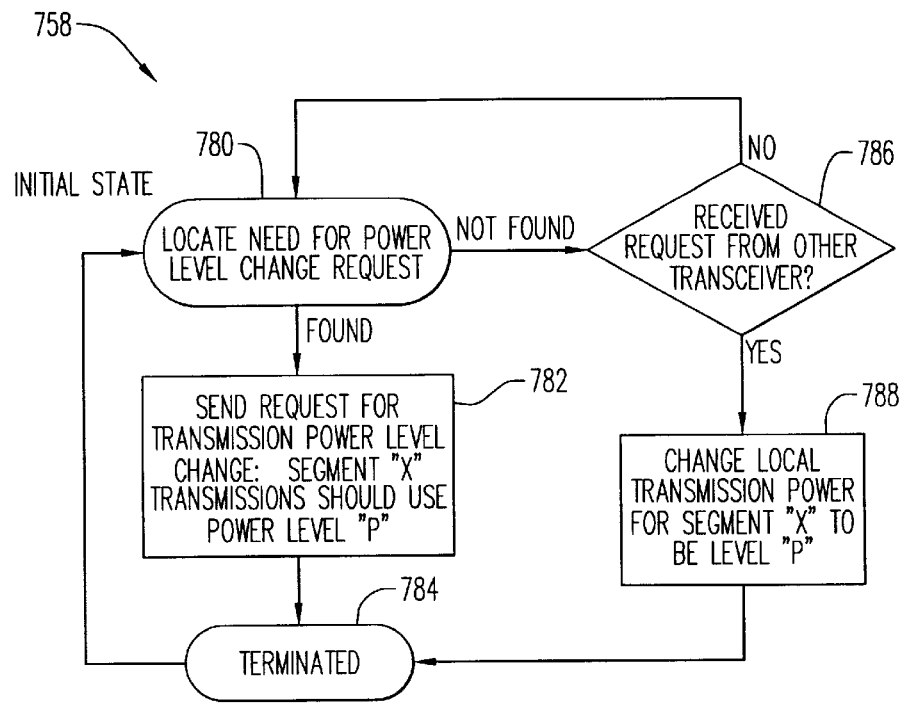
FIG. 10 illustrates a flow diagram of a transmission power level change operation, in accordance with a second embodiment of the present invention.
FIG. 11 illustrates a table of transmission power levels as a function of values found in a erred reception RSSI register and a valid reception RSSI register as shown in FIG. 8, in accordance with the second embodiment of the present invention.

Referring to FIG. 10, there is provided an example of a transmission power level change operation of Step 764 of FIG. 9. Subsystem 300 determines whether a power level change request needs to be generated for any used segment (Step 780). If so, subsystem 300 transmits a signal to the other communicating party indicating a request for transmission power level change that includes the particular used segment requiring the change and the power level (P) or any other signal for accomplishing the same. Thereafter, the process is terminated at Step 784.

If a power level change request does not need to be generated for any used segment, subsystem 300 checks whether a power level change request was transmitted from the other party (Step 786). If not, subsystem 300 checks again whether a power level change request needs to be generated for any used segment (Step 780). Otherwise, subsystem 300 changes the local transmission power level for a used segment to a power level (P) according to the received request. The process is then terminated at Step 784.

FIG. 11 illustrates a table of a preferred transmission power level as a function of values found in RSSI registers 718, 722 (where the minimal power=0 and the maximum power=3).

In summary, the first embodiment of the present invention provides an FH communication apparatus and method thereof for dividing an available spectrum of frequencies into a plurality of segments. Each segment includes a subset of the frequencies, preferably a contiguous subset of the frequencies. FH communication is thus performed using a subset of the segments, e.g., the used segments. The present invention further provides an FH communication apparatus and method thereof for substituting a used segment having an error value greater than or equal to a predetermined threshold with an unused segment.

The second embodiment of the present invention provides an FH communication apparatus and method thereof for automatically controlling the power transmission levels for each used segment by determining an optimal transmission power level for each used segment and notifying the other communicating party to transmit data packets according to the determined optimal transmission power levels. More specifically, in the second embodiment of the present invention, a receiving-side party notifies the transmitting-side party to adjust (e.g., increase or decrease) the transmission power level of each used segment according to detected reception errors until the optimum transmission power level is reached. Accordingly, such an arrangement reduces power consumption of the FH system, minimizes the possibility of interfering with neighboring communication devices, and increases data security by minimizing the reception zone of the data packets.

The invention having thus been described with particular reference to the preferred forms thereof, it will be obvious that various changes and modifications may be made therein without departing from the spirit and scope of the invention as defined in the appended claims.

What is claimed is:

1. A method for performing frequency hopping communication with another party over an available spectrum of frequencies, the spectrum being arranged into a plurality of segments, each of the segments comprising a subset of the available spectrum including multiple possible hopping frequencies, the method comprising the steps of:

(a) receiving data over a sequence of hopping frequencies, each of the hopping frequencies being part of one or more used segment(s) from the plurality of segments, (b) identifying an error in the received data and an erred segment in which the error occurred, and modifying an error value associated with the erred segment accordingly;

(c) replacing the erred segment with an unused segment from the plurality of segments to attempt communication over a less error prone segment, when the error value for the erred segment reaches at least a predetermined threshold; and (d) notifying the other party of the unused segment which has been newly selected.

2. The method as recited in claim 1, wherein the step (b) modifies the error value by an amount determined according to a type of the error.

3. The method as recited in claim 2, wherein the error is not part of a predefined error occurrence pattern, the step (b) incrementing the error value by a first amount.

4. The method as recited in claim 3, wherein the error is part of a predefined error occurrence pattern, the step (b) incrementing the error value by a second amount which is greater than the first amount.

5. The method as recited in claim 1, further comprising the step of decrementing the error value of the erred segment by a third amount, when no error has been identified for the erred segment in a predetermined period.

6. The method as recited in claim 5, wherein the predetermined period is one hopping cycle.

7. The method as recited in claim 1, wherein each segment of the plurality of segments includes an identical number of frequencies.

8. The method as recited in claim 1, wherein each segment corresponds to a contiguous subset of possible hopping frequencies within the available spectrum.

9. A frequency hopping communication apparatus for performing frequency hopping communication with another party over an available spectrum of frequencies, the spectrum being arranged into a plurality of segments, each segment comprising a subset of available spectrum including multiple possible hopping frequencies, the apparatus comprising:

communication means for communicating with another party, said communication means receiving data over a sequence of hopping frequencies from the another party, each of the hopping frequencies being part of one or more used segment(s) from the plurality of segments;

storage means for storing an error value for each used segment; and processing means for:
(a) identifying an error in the received data and an erred segment in which the error occurred,
(b) modifying the error value associated with the erred segment accordingly,
(c) replacing the erred segment with an unused segment from the plurality of segments to attempt communication over a less error prone segment, when the error value for the erred segment has reached at least a predetermined threshold, and
(d) notifying the other party of the unused segment which has been newly selected, via the communication means.

10. The apparatus as recited in claim 9, wherein the processing means modifies the error value of the erred segment according to a type of the identified error.

11. The apparatus as recited in claim 10, wherein the processing means increments the error value by a first amount when the error is not part of a predefined error occurrence pattern.

12. The apparatus as recited in claim 11, wherein the processing means increments the error value by a second amount when the error is part of a predefined error occurrence pattern, said second amount being greater than said first amount.

13. The apparatus as recited in claim 9, wherein said processing means decrements the error value by a third amount when no error has been determined for the used segment in a predetermined period.

14. The apparatus as recited in claim 13, wherein said predetermined period is one hopping cycle.

15. The apparatus as recited in claim 9, wherein each segment includes an identical number of frequencies.

16. The apparatus as recited in claim 9, wherein each segment corresponds to a contiguous subset of possible hopping frequencies of the available spectrum.

* * * * *